US012506306B2

(12) United States Patent
Lee et al.

(10) Patent No.: US 12,506,306 B2
(45) Date of Patent: Dec. 23, 2025

(54) CONNECTOR DEVICE

(71) Applicant: HL MANDO CORPORATION, Pyeongtaek (KR)

(72) Inventors: Su-Min Lee, Siheung (KR); Ji Hwan Kim, Suwon (KR)

(73) Assignee: HL MANDO CORPORATION, Pyeongtaek (KR)

( * ) Notice: Subject to any disclaimer, the term of this patent is extended or adjusted under 35 U.S.C. 154(b) by 309 days.

(21) Appl. No.: 18/059,006

(22) Filed: Nov. 28, 2022

(65) Prior Publication Data

US 2023/0208083 A1 Jun. 29, 2023

(30) Foreign Application Priority Data

Dec. 7, 2021 (KR) ........................ 10-2021-0174228

(51) Int. Cl.
*H01R 13/7193* (2011.01)
*H01R 12/55* (2011.01)
*H01R 13/66* (2006.01)

(52) U.S. Cl.
CPC ......... *H01R 13/7193* (2013.01); *H01R 12/55* (2013.01); *H01R 13/6625* (2013.01)

(58) Field of Classification Search
CPC ................ H01R 13/7193; H01R 12/55; H01R 13/6625; H01R 12/73; H01R 13/7197; H01R 13/658; H01F 2017/065; H01F 17/06
See application file for complete search history.

(56) References Cited

U.S. PATENT DOCUMENTS

| | | | | |
|---|---|---|---|---|
| 9,035,193 B2 * | 5/2015 | Kagimura | H05K 3/32 174/251 |
| 9,356,362 B2 * | 5/2016 | Miyawaki | H01R 31/085 |
| 10,636,556 B2 * | 4/2020 | Ishihara | H01F 27/2847 |
| 11,764,524 B2 * | 9/2023 | Solc | H01R 13/7193 439/78 |
| 2006/0128197 A1 * | 6/2006 | McGowan | H01R 12/58 439/212 |
| 2020/0403357 A1 * | 12/2020 | Yoneoka | H01R 13/719 |

FOREIGN PATENT DOCUMENTS

| | | | |
|---|---|---|---|
| GB | 2300525 A * | 11/1996 | H01R 13/7197 |
| JP | 6428271 B2 * | 11/2018 | H02M 1/44 |

* cited by examiner

*Primary Examiner* — Andrea Lindgren Baltzell
*Assistant Examiner* — Kimberly E Glenn
(74) *Attorney, Agent, or Firm* — Harvest IP Law, LLP

(57) ABSTRACT

A connector device electrically connected to a circuit board includes: a body portion connected externally; a housing surrounding at least a portion of the body portion; a first terminal extending downward from the body portion and connected to a first capacitor of the circuit board; a second terminal extending downward from the body portion to be spaced apart from the first terminal and connected to a second capacitor of the circuit board; and a ferrite core through which the second terminal passes.

8 Claims, 5 Drawing Sheets

CONNECTOR DEVICE

CROSS-REFERENCE TO RELATED APPLICATION

This application claims priority to Korean Patent Application No. 10-2021-0174228, filed on Dec. 7, 2021, and all the benefits accruing therefrom under 35 U.S.C. § 119, the content of which in its entirety is herein incorporated by reference.

BACKGROUND

1. Field

Embodiments of the present disclosure relates to a connector device, and more particularly, to a connector device having noise removal performance.

2. Description of the Related Art

In general, an electronic device having an electronic circuit generates electrical noise, and this noise may be a factor causing electromagnetic interference (EMI).

As electronic devices used in the automotive environment increase, the occurrence of EMI problems and test regulations are getting more tightened.

In particular, since the electric controllers are connected to other devices with a bundle of wires, conductive noise may cause malfunctioning damage to other devices due to electromagnetic interference.

It is to be understood that this background of the technology section is intended to provide useful background for understanding the technology and as such disclosed herein, the technology background section may include ideas, concepts or recognitions that were not portion of what was known or appreciated by those skilled in the pertinent art prior to a corresponding effective filing date of subject matter disclosed herein.

SUMMARY

Embodiments of the invention are directed to a connector device having noise removal performance.

According to an embodiment, a connector device electrically connected to a circuit board includes: a body portion connected externally; a housing surrounding at least a portion of the body portion; a first terminal extending downward from the body portion and connected to a first capacitor of the circuit board; a second terminal extending downward from the body portion to be spaced apart from the first terminal and connected to a second capacitor of the circuit board; and a ferrite core through which the second terminal passes.

In some embodiments, the ferrite core may have a toroidal shape.

In some embodiments, the ferrite core may be spaced apart from the circuit board.

In some embodiments, the connector device may further include a securing portion provided on one side of the housing to secure the ferrite core in a state of being spaced apart from the circuit board by a predetermined height.

In some embodiments, the ferrite core may be detachably coupled to the second terminal through the securing portion.

In some embodiments, the ferrite core may form a pi (π)-type noise filter as the first terminal and the second terminal are connected to the circuit board.

In some embodiments, the ferrite core may be spaced apart from the first terminal by a predetermined distance in a state in which the ferrite core is coupled to the second terminal.

In some embodiments, the second terminal may include a second diagonal extension section and extend from another side of the body portion to be stepped.

In some embodiments, the first terminal may include a first diagonal extension section and extend from one side of the body portion to be stepped.

According to one or more embodiments of the present disclosure, the effect of reducing a circuit board mounting space may be achieved by configuring a pi (π)-type EMI filter through a first terminal portion and a second terminal portion of a connector which is provided in an overall "h" shape.

In addition, since a ferrite core does not have a unitary structure with the connector, it is possible to change the ferrite core without additional manufacturing of the connector, and accordingly, it is easy to derive, verify and expand optimal specification.

In addition, since the coil is not wound on the ferrite core, it is possible to implement a low-cost inductor and a pi (π)-type filter, and it is easy to increase a conductible current of the inductor.

BRIEF DESCRIPTION OF THE DRAWINGS

The above and other features and aspects of the present disclosure of disclosure will be more clearly understood from the following detailed description taken in conjunction with the accompanying drawings, in which.

DETAILED DESCRIPTION

Figure 1:
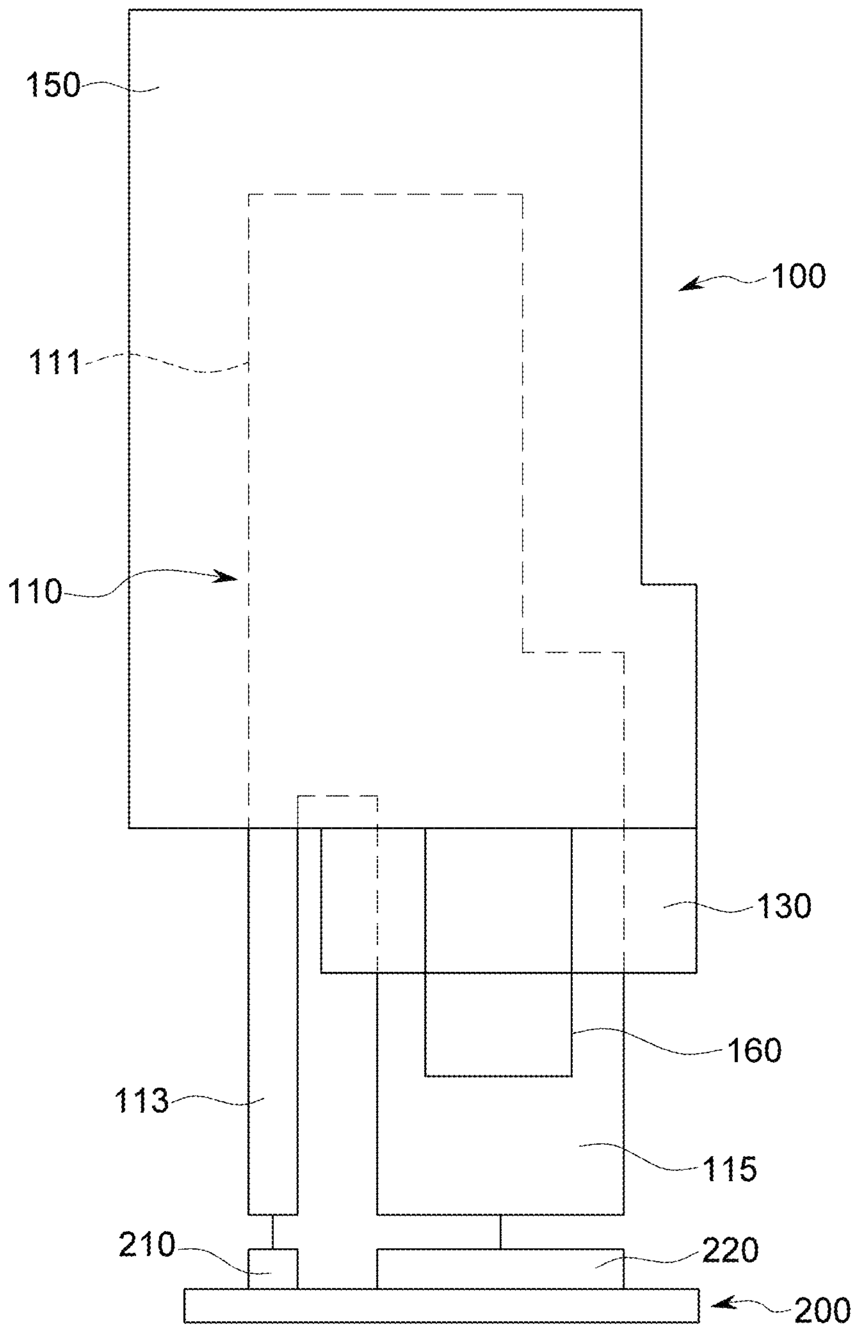
FIG. 1 is a schematic view illustrating a connector device according to various embodiments of the present disclosure.

Hereinafter, embodiments of the present disclosure will be described with reference to drawings for convenience of description. In describing reference numerals for components in each drawing, the same components are denoted by the same reference numerals as much as possible even if they are illustrated in different drawings.

Terms or words used in the present specification and claims are not limited to their ordinary or dictionary meanings, and it should be interpreted as meaning and concept consistent with the technical idea of the present disclosure based on the principle that the inventor may properly define the concept of the term in order to best describe his disclosure. In addition, in describing components of embodiment of the present disclosure, terms such as first, second, A, B, (a), (b), and the like may be used. These terms are only for distinguishing the component from other components, and the essence, order, or order of the component is not limited by the term. When it is described that a component is 'connected' or 'coupled' to another component, the component may be directly connected or coupled to the another component, but it should be also understood that another component may be may be 'connected' or 'coupled' between the component and the another component.

Therefore, embodiments described in this specification and the configurations illustrated in the drawings are only the most preferred embodiments of the present disclosure and do not represent all the technical spirit of the present disclosure, so it should be understood that there may be various equivalents and variations that may substitute the embodiments at the time of the present application. In addition, detailed descriptions of well-known functions and configurations that may unnecessarily obscure the gist of the present disclosure will be omitted.

Hereinafter, a connector device according to various embodiments of the present disclosure will be described in detail with reference to the accompanying drawings.

Figure 2:
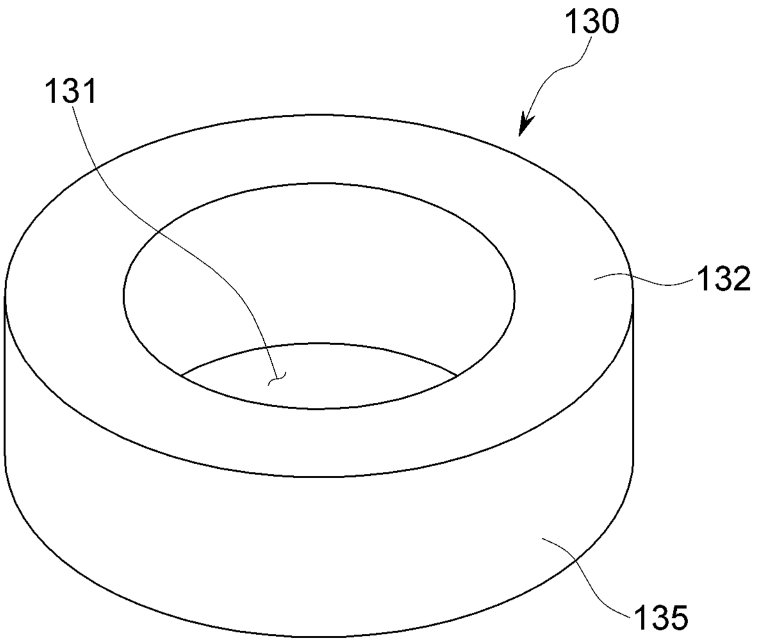
FIG. 2 is a perspective view illustrating a ferrite core provided in a connector device according to various embodiments of the present disclosure.
Figure 3:
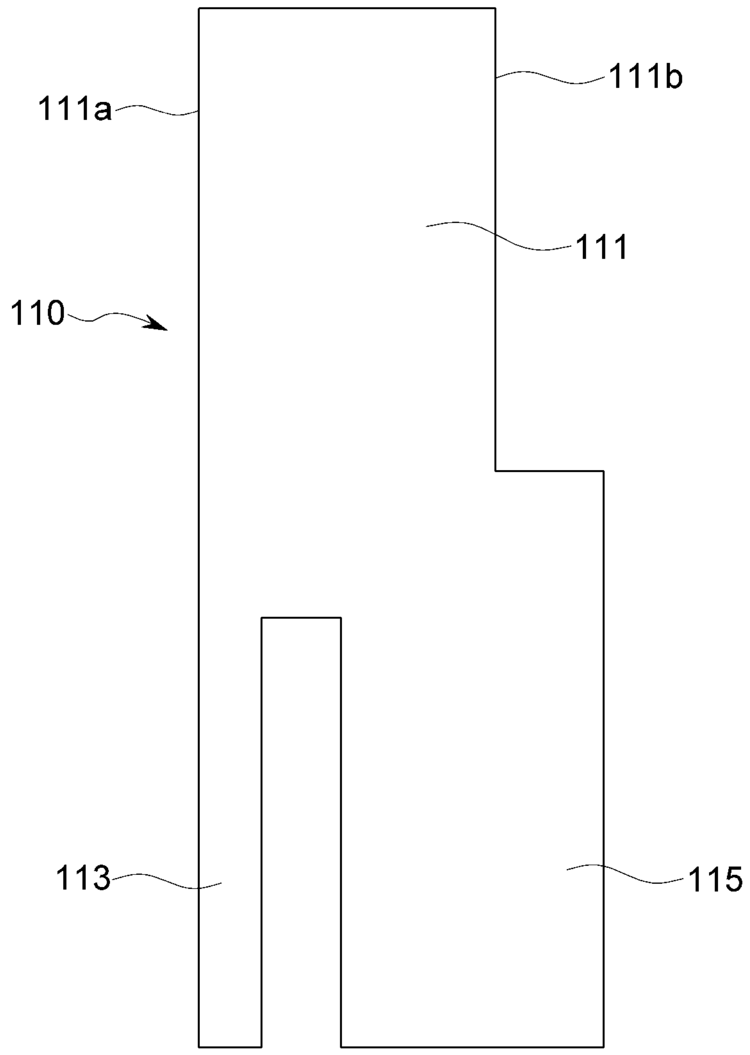
FIGS. 3 to 5 are views schematically illustrating terminals of a connector device according to various embodiments of the present disclosure.
Figure 4:
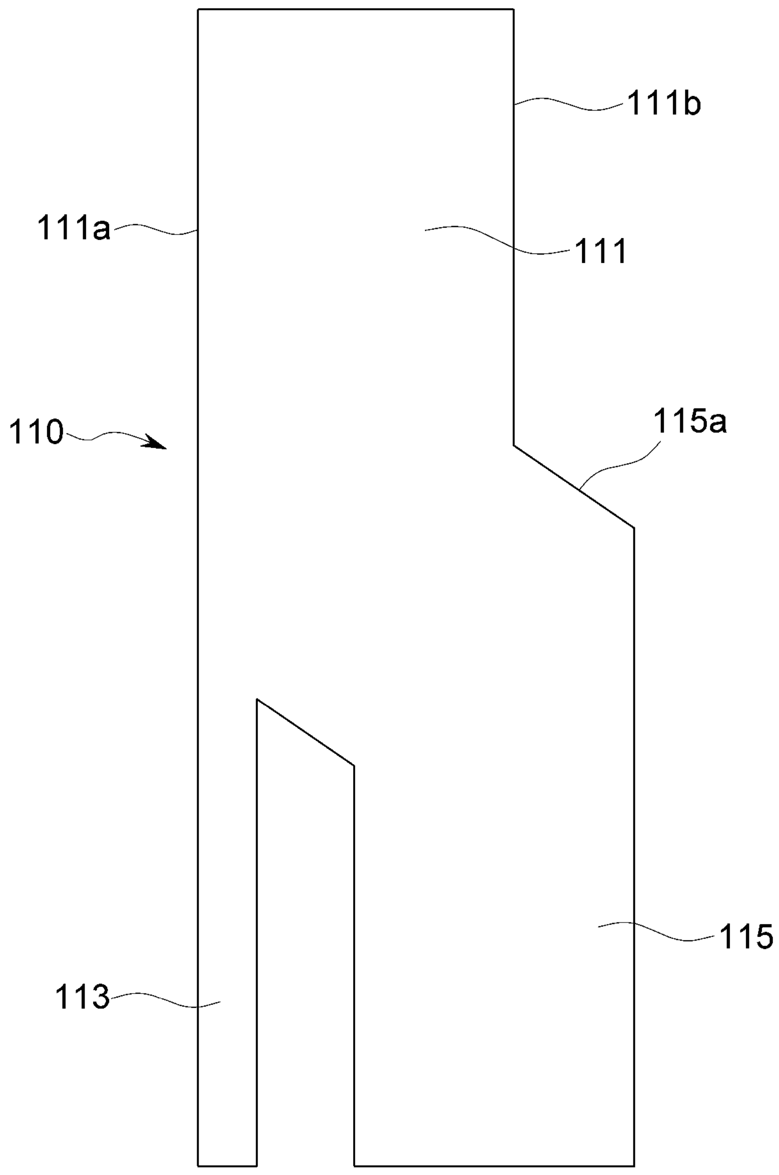
Figure 5:
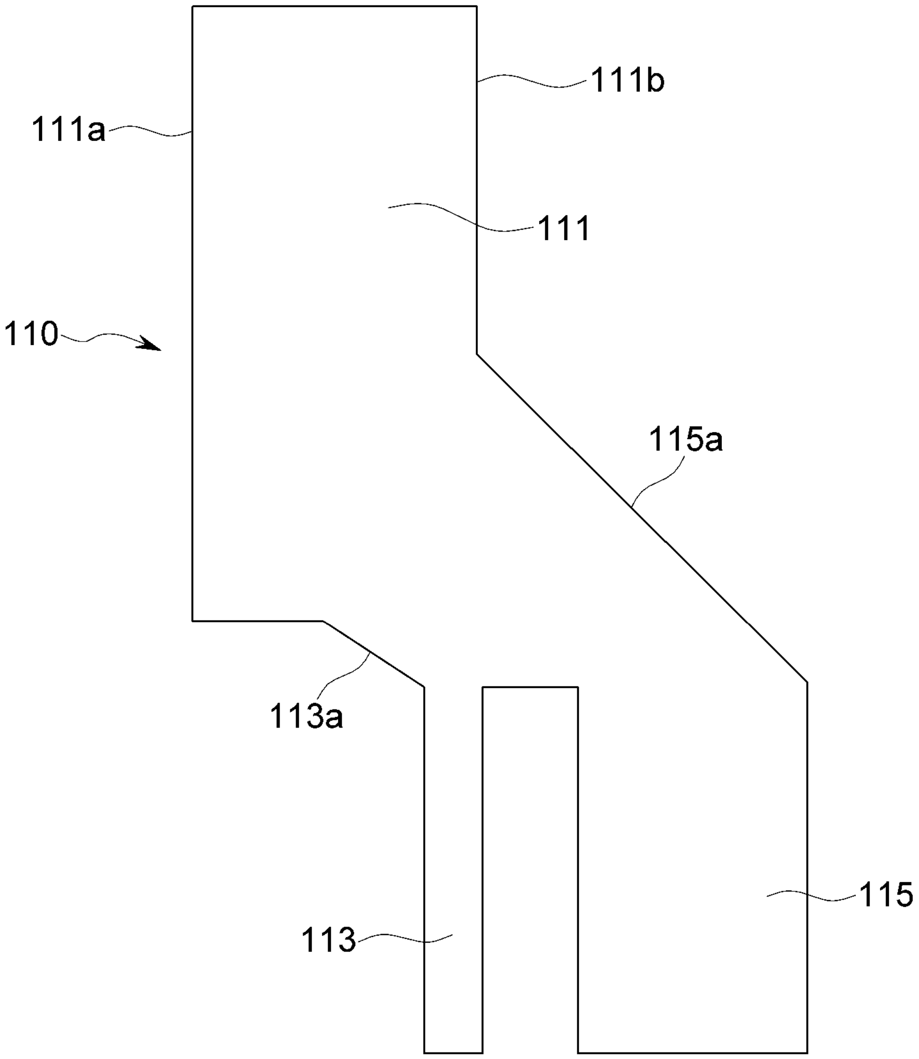

FIG. 1 is a schematic view illustrating a connector device 100 according to various embodiments of the present disclosure. FIG. 2 is a perspective view illustrating a ferrite core 130 provided in the connector device 100 according to various embodiments of the present disclosure. FIGS. 3 to 5 are views schematically illustrating terminals 110 of the connector device 100 according to various embodiments of the present disclosure.

Referring to FIGS. 1 to 5, a connector device 100 according to various embodiments of the present disclosure is for supplying power to a circuit board of an electronic device, and may include a terminal 110, a ferrite core 130 and a housing 150. In addition, a first capacitor 210 and a second capacitor 220 disposed on a circuit board 200 to be connected to the terminal 110 may be included.

The terminal 110 may include a body portion 111 including a metal material or a conductive material and connected externally (e.g. by wire), a first terminal portion 113 extending downward from the body portion 111 and connected to the first capacitor 210 of the circuit board 200; and a second terminal portion 115 extending downward from the body portion 111 to be horizontally spaced apart from the first terminal portion 113 and connected to the second capacitor 220 of the circuit board 200. The first terminal portion 113 and the second terminal portion 115 may also include or be made of a metal material or a conductive material, similar to the body portion 111.

In an embodiment of the present disclosure, the first terminal portion 113 and the second terminal portion 115 may be unitarily formed with the body portion 111, and as illustrated in FIGS. 1 and 3, the terminal 110 may be provided to have a cross-section of a substantially "h" shape.

In an embodiment, the first terminal portion 113 may be soldered to the circuit board 200 so as to be electrically connected to the first capacitor 210, and the second terminal portion 115 may be soldered to the circuit board 200 to be electrically connected to the second capacitor 220 disposed from a power input terminal parallelly to the first capacitor 210.

Referring to FIGS. 3 and 4, according to an embodiment, the first terminal portion 113 is provided to extend vertically downwardly from one cross-section 111 of the body portion 111, and the second terminal portion 115 may include a second diagonal extension section 115*a* and extend vertically downward from another cross-section 111*b* of the body portion 111 so as to be stepped. In addition, as illustrated in FIG. 5, the first terminal portion 113 may include a first diagonal extension section 113*a* and extend from one cross-section 111*a* of the body portion 111 to be stepped, thereby providing a mounting space of the circuit board 200 to be used flexibly as needed. As used herein, the first diagonal extension section 113*a* and the second diagonal extension section 115*a* may be conceptually distinguished from the first terminal portion 113 and the second terminal portion 115, respectively, rather than being physically separated from the first terminal portion 113 and the second terminal portion 115. In addition, as illustrated in FIG. 5, the first diagonal extension section 113*a* and the second diagonal extension section 115*a* may be unitarily formed.

The ferrite core 130 including an insulating ferromagnetic material may be provided to remove noise generated from the connector 100. In an embodiment, the ferrite core 130 may disposed so that the second terminal portion 115 may pass therethrough to constitute an inductor, thereby serving as a filter to block high frequencies, and for example, the ferrite core 130 may be formed including $Fe_2O_3$, NiO, and ZnO as a main component.

The ferrite core 130 may be provided in a toroidal shape. A through hole 131 may be defined to pass through a center of the ferrite core 130, and the second terminal portion 115 may pass through the through hole 131.

The ferrite core 130 may include an upper surface 132, a lower surface and a side surface 135. The through hole 131 may be defined to communicate the upper surface 132 and the lower surface and to be open from both the upper surface 132 and the lower surface.

The upper surface 132 of the ferrite core 130 may be provided to be in contact with a bottom surface of the housing 150. The ferrite core 130 may be disposed to be spaced apart from the circuit board 200 by a predetermined distance upward from the circuit board 200. In addition, the ferrite core 130 may be disposed so that the side surface 135 is spaced apart from a side surface of the first terminal portion 113 by a predetermined distance, while being coupled to the second terminal portion 115. In addition, in the present disclosure, since the ferrite core 130 is detachably provided, it may be easy to change a size of the ferrite core 130 as necessary, through a gap with the first terminal portion 113.

In the present disclosure, since a coil is not wound on the ferrite core 130, it is possible to implement a low-cost inductor and a pi ($\pi$)-type filter, and there is an effect that it is easy to increase a conductible current of the inductor.

The housing 150 may include an insulating material, and may be provided to surround at least a portion of the terminal 110, and may be provided to surround, for example, the body portion 111, as illustrated in FIG. 1.

A securing portion 160 may be formed on one side of the housing 150. The securing portion 160 may be formed to protrude from one side of the housing 150, and in one embodiment, may be formed unitarily with the housing 150. In the present disclosure, the ferrite core 130 may be secured (e.g., fixed), through the use of the securing portion 160, to surround the second terminal portion 115, while being spaced apart from the circuit board 200 by a predetermined height.

In the present disclosure, the ferrite core 130 has a structure in which the ferrite core 130 is secured by the securing portion 160, and since it is not a structure formed unitarily with the connector, it is possible to change the ferrite core 130 without the need for additional manufacturing of the connector.

The securing portion 160 may be provided in a hook shape, but embodiments of the present invention are not limited thereto, and it will be apparent that any shape capable of securing the toroidal-shaped ferrite core 130 is applicable. In the present disclosure, since the ferrite core 130 is detachably coupled through such a securing portion, there is an advantage that it is easy to increase the conductible current of the inductor.

The circuit board 200 to which a power is input from the connector may be a known printed circuit board (PCB), and may be electrically connected to a terminal of the connector. The first capacitor 210 may be mounted on the circuit board 200 at a position where the first terminal portion 113 of the terminal 110 is bonded, and the second capacitor 220 may be mounted on a position where the second terminal portion 115 is bonded.

The first capacitor 210 and the second capacitor 220 are to reduce noise by cutting off a DC power while passing an AC power, and a known capacitor may be used.

According to an embodiment of the present disclosure, a pi (π)-type EMI filter may be configured by capacitors parallelly connected from the power input terminal through the first terminal portion 113 and the second terminal portion 115, and by the ferrite core 130 formed in series through the second terminal portion 115.

As described above, according to various embodiments of the present disclosure, a pi (π)-type EMI filter may be configured through the first terminal portion 113 and the second terminal portion 115 of the connector provided in an overall "h" shape, thereby capable of reducing the circuit board mounting space.

In addition, since the ferrite core does not have a unitary structure with the connector, it is possible to change the ferrite core without additional manufacturing of the connector, so it is easy to derive, verify, and expand the optimal specification.

In addition, since a coil is not wound on the ferrite core, it is possible to implement a low-cost inductor and a pi (π)-type filter, and there is an effect that it is easy to increase the conductible current of the inductor.

Herein above, even though all the components constituting the embodiment of the present disclosure are described as being combined or operated in combination, the present disclosure is not necessarily limited to those embodiments. That is, within the scope of the object of the present disclosure, all the components may operate by selectively combining one or more. In addition, terms such as 'include', 'comprise' or 'have' described above mean that the corresponding component may be inherent unless otherwise stated, so other components are not excluded, and it should rather be interpreted as further including other components. All terms, including technical and scientific terms, have the same meaning as commonly understood by one of ordinary skill in the art to which the present disclosure belongs, unless otherwise defined. Commonly used terms such as terms defined in the dictionary should be interpreted as being consistent with the contextual meaning of the related art, and are not interpreted in an ideal or excessively formal meaning unless explicitly defined in the present disclosure.

The above description is merely illustrative of the technical idea of the present disclosure, and various modifications and variations are possible without departing from the essential characteristics of the present disclosure by those skilled in the art to which the present disclosure pertains. Accordingly, the embodiments disclosed in the present disclosure are for explanation rather than limiting the technical spirit of the present disclosure, and the scope of the technical spirit of the present disclosure is not limited by these embodiments. The protection scope of the present disclosure should be construed by the following claims, and all technical ideas within the equivalent range should be construed as being included in the scope of the present disclosure.

What is claimed is:

1. A connector device electrically connected to a circuit board, the connector device comprising:

a body portion connected externally;

a housing surrounding at least a portion of the body portion;

a first terminal branching and extending downward from the body portion and connected to a first capacitor of the circuit board;

a second terminal branching and extending downward from the body portion to be spaced apart from the first terminal and connected to a second capacitor of the circuit board; and a ferrite core through which the second terminal passes, wherein the first terminal does not pass through the ferrite core and is spaced apart laterally from the ferrite core by a predetermined distance.

2. The connector device of claim 1, wherein the ferrite core has a toroidal shape.

3. The connector device of claim 1, wherein the ferrite core is spaced apart from the circuit board.

4. The connector device of claim 3, further comprising a securing portion provided on one side of the housing to secure the ferrite core in a state of being spaced apart from the circuit board by a predetermined height.

5. The connector device of claim 4, wherein the ferrite core is detachably coupled to the second terminal through the securing portion.

6. The connector device of claim 1, wherein the ferrite core forms a pi (π)-type noise filter as the first terminal and the second terminal are connected to the circuit board.

7. The connector device of claim 1, wherein the second terminal includes a second diagonal extension section and extends from another side of the body portion to be stepped.

8. The connector device of claim 7, wherein the first terminal includes a first diagonal extension section and extends from one side of the body portion to be stepped.

* * * * *